(12) United States Patent
Ko et al.

(10) Patent No.: US 8,233,559 B2
(45) Date of Patent: Jul. 31, 2012

(54) METHOD AND APPARATUS FOR TRANSMITTING A PILOT IN MULTI-ANTENNA SYSTEM

(75) Inventors: Hyun Soo Ko, Anyang-si (KR); Jin-young Chun, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 12/403,298

(22) Filed: Mar. 12, 2009

(65) Prior Publication Data
US 2009/0232239 A1    Sep. 17, 2009

Related U.S. Application Data

(60) Provisional application No. 61/035,744, filed on Mar. 12, 2008.

(30) Foreign Application Priority Data

Oct. 14, 2008  (KR) .................. 10-2008-0100859

(51) Int. Cl.
*H04L 1/02* (2006.01)
(52) U.S. Cl. ........................... 375/267; 375/299
(58) Field of Classification Search .............. 375/267, 375/299, 347; 370/206, 208–210, 332, 344
See application file for complete search history.

(56) References Cited

U.S. PATENT DOCUMENTS

| | | | |
|---|---|---|---|
| 2006/0098568 A1* | 5/2006 | Oh et al. | 370/206 |
| 2007/0183371 A1* | 8/2007 | McCoy | 370/334 |
| 2008/0043677 A1* | 2/2008 | Kim et al. | 370/332 |
| 2008/0049709 A1* | 2/2008 | Pan et al. | 370/344 |
| 2008/0144733 A1* | 6/2008 | ElGamal et al. | 375/267 |
| 2009/0304109 A1* | 12/2009 | Kotecha | 375/299 |
| 2010/0081399 A1* | 4/2010 | Zangi | 455/114.3 |

* cited by examiner

*Primary Examiner* — Emmanuel Bayard
(74) *Attorney, Agent, or Firm* — Lee, Hong, Degerman, Kang & Waimey

(57) ABSTRACT

A method of transmitting a pilot method in a multi-antenna system is provided. The method comprises generating a preceding matrix including a preceding vector, the preceding vector being applied to each of data streams to be transmitted, performing preceding procedure for a pilot by using the preceding matrix, and transmitting the precoded pilot, wherein transmission power of the precoded pilot is determined specifically to the each of the data streams. The transmission power of a precoded pilot can be controlled adaptively, individually and independently for each channel to improve channel estimation performance.

8 Claims, 4 Drawing Sheets

METHOD AND APPARATUS FOR TRANSMITTING A PILOT IN MULTI-ANTENNA SYSTEM

CROSS-REFERENCE TO RELATED APPLICATIONS

This application claims the benefit of priority of U.S. Provisional Application No. 61/035,744 filed on Mar. 12, 2008, and Korean Patent Application No. 10-2008-0100859 filed on Oct. 14, 2008, which are incorporated by reference in their entirety herein.

BACKGROUND

1. Field of the Invention

The present invention relates to wireless communication, and more particularly, to a method and apparatus for transmitting a pilot in a multi-antenna system.

2. Related Art

With the popularization of information communication services and the advent of a variety of multimedia services and high-quality services, demands for communication services are rapidly increased. To satisfy these demands, various wireless communication techniques are studied in various fields.

Next-generation wireless communication systems are required to transmit high-quality large-capacity multimedia data at a high speed by using limited frequency resources. To achieve this in a wireless channel with a limited bandwidth, it is required to overcome inter-symbol interference and frequency selective fading which are generated when multimedia data is transmitted at a high speed while maximizing spectral efficiency. Orthogonal frequency division multiplexing (OFDM) and multiple-input multiple-output (MIMO) techniques are spotlighted among techniques developed to maximize spectral efficiency.

OFDM uses a plurality of orthogonal subcarriers and orthogonality between inverse fast Fourier transform (IFFT) and fast Fourier transform (FFT). A transmitter performs IFFT on data and transmits the inverse-fast-Fourier-transformed data to a receiver. The receiver performs FFT on the received data to restore the original data. That is, IFFT is used to combine multiple subcarriers and FFT is used to split multiple subcarriers. According to OFDM, complexity of the receiver in a frequency selective fading environment of a broadband channel can be reduced and spectral efficiency can be increased through selective scheduling in a spectral domain by using different channel characteristics of subcarriers. Orthogonal frequency division multiple access (OFDMA) is a multiple-access method based on OFDM. The OFDMA can respectively allocate different subcarriers to multiple users to improve the efficiency of radio resources.

The MIMO technique can be used for two purposes. Firstly, the MIMO technique can be used for the purpose of increasing a diversity gain to reduce performance deterioration caused by a fading environment of a channel. Secondly, the MIMO system can be used for the purpose of increasing a data transfer rate in the same frequency band. The MIMO technique can transmit a large quantity of data without increasing a frequency bandwidth as compared to a single-input single-output system using a single transmitting/receiving antenna.

An MIMO channel provided according to multiple antennas can be decomposed into independent channels. When the number of transmission antennas is Nt and the number of receiving antennas is Nr, the number of independent channels, Ni, corresponds to min {Nt, Nr} and each independent channel can be referred to as a spatial layer. Generally, a rank is defined as the number of non-zero eighenvalues in an MIMO channel matrix.

In a MIMO system, a transmitter performs preceding that multiplexes a transmission signal by a weight. Precoding is a technique that pre-processes a transmission signal by using a weight and transmits the pre-processed transmission signal. The weight is selected or calculated based on a channel to which the transmission signal will be subjected. In a frequency division duplex (FDD) system, generally, a receiver determines the weight and transmits the weight to a transmitter and the transmitter determines a weight to be actually used to transmit signals based on the weight received from the receiver. In a time division duplex (TDD) system, a transmitter determines the weight through a sounding channel.

A model of a received signal vector y is represented according to Equation 1.

$$y = HWS + N \qquad \text{[Equation 1]}$$

Here, H represents a channel matrix, W represents a weight, S denotes a signal vector, and N denotes a noise vector. The weight W can have a matrix or vector form. A common pilot is used to estimate the channel matrix H. A precoded pilot is used to estimate HW. That is, a receiver uses HW acquired according to the precoded pilot to detect S.

The precoded pilot can directly detect S by using the equivalent channel HW. When the precoded pilot is used in rank 1 transmission, a signal-to-noise ratio (SNR) gain can be expected in signal estimation, and thus reliability of channel estimation performance can be improved. When the precoded pilot is used in transmission of rank 2 or higher, improvement of yield as well as the SNR gain can be expected in channel estimation.

However, a multi-antenna system has a very complicated channel environment and the SNR gain and yield improvement are not secured for all the complicated channels of the multi-antenna system because there is a limitation in achieving a SNR gain and yield improvement for data streams subjected to a very poor channel among data streams input to a preceding unit and respectively transmitted to a receiver through different channels.

Accordingly, a method and apparatus for transmitting a precoded pilot to improve channel estimation performance is required.

SUMMARY

The present invention provides a method and apparatus for transmitting a pilot to improve channel estimation in a multi-antenna system.

In an aspect, a method for transmitting a pilot in a multi-antenna system is provided. The method includes generating a preceding matrix including a preceding vector, the preceding vector being applied to each of data streams to be transmitted, performing preceding procedure for a pilot by using the preceding matri, and transmitting the precoded pilot. Transmission power of the precoded pilot is determined specifically to the each of the data streams.

In another aspect, an apparatus for transmitting a pilot to a receiver in a multi-antenna system is provided. The apparatus includes a preceding unit preceding pilots respectively applied to a plurality of data streams, a power controller controlling transmission powers of the precoded pilots, a subcarrier allocation unit mapping the precoded pilots to subcarriers, an orthogonal frequency division multiplexing (OFDM) modulator performing inverse fast fourier transformation (IFFT) on the precoded pilots mapped to the subcarriers to generate OFDM symbols, and multiple antennas transmitting the OFDM symbols.

The transmission power of a precoded pilot can be controlled adaptively, individually and independently for each channel to improve channel estimation performance.

DESCRIPTION OF EXEMPLARY EMBODIMENTS

Hereinafter, an embodiment of the present invention will be described below with reference to the accompanying drawings.

Figure 1:
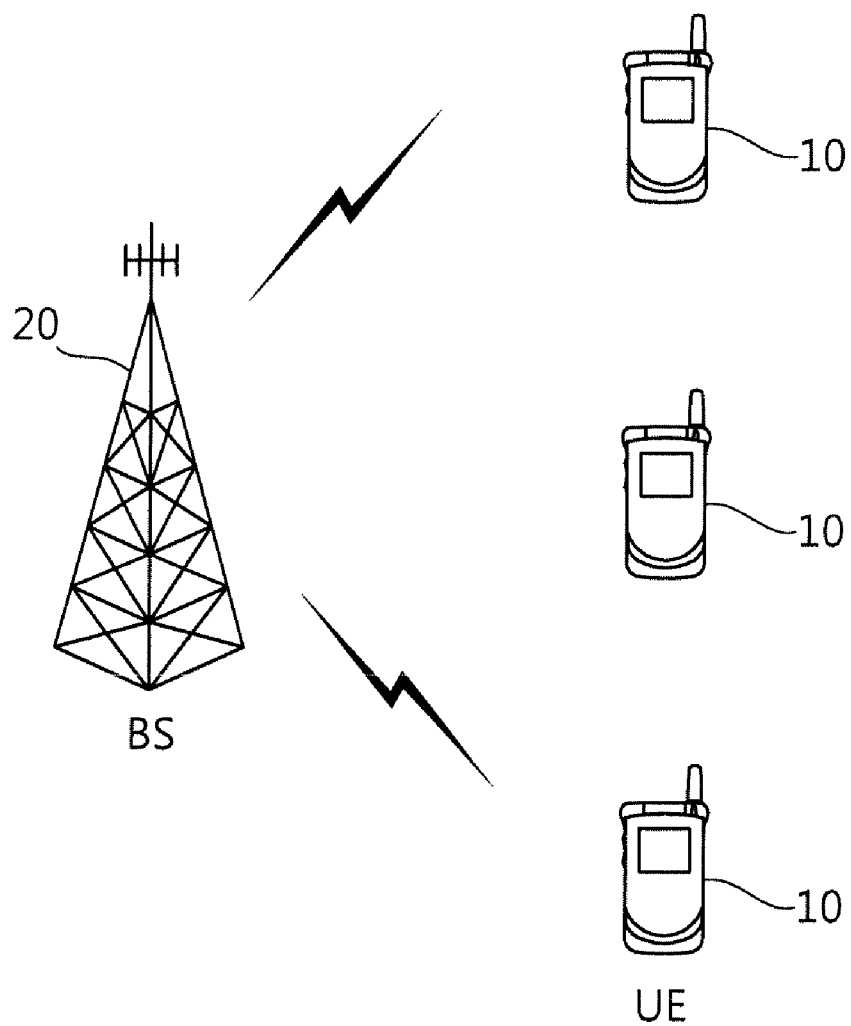
FIG. 1 illustrates a wireless communication system.

FIG. 1 illustrates a wireless communication system. The wireless communication system is widely distributed to provide a variety of communication services such as audio data and packet data.

Referring to FIG. 1, the wireless communication system includes user equipment (UE) 10 and a base station (BS) 20. The UE 10 can be fixed or movable and referred to as other terms such as a mobile station, a user terminal, a subscriber station, and a wireless device. The BS 20 is a fixed station communicating with the UE 10 and can be referred to as other terms such as a node-B, a base transceiver system, and an access point. A single BS can include at least one cell.

A downlink (DL) means transmission of data from the BS 20 to the UE 10 and an uplink (UL) means transmission of data from the UE 10 to the BS 20 in the following description. In the downlink, a transmitter can be a part of the BS 20 and a receiver can be the UE 10. In the uplink, the transmitter can be the UE 10 and the receiver can be a part of the BS 20.

The wireless communication system can be an OFDM/OFDMA based system. OFDM uses a plurality of orthogonal subcarriers and orthogonality between IFFT and FFT. The transmitter performs IFFT on data and transmits the inverse-fast-Fourier-transformed data to the receiver and the receiver performs FFT on the received data to restore the original data. The transmitter uses IFFT to combine multiple subcarriers and the receiver uses FFT to split the multiple subcarriers. There is no limit to a multiple access technique applied to the wireless communication system. The wireless communication system can be based on multi-access techniques such as code division multiple access (CDMA), time division multiple access (TDMA), frequency division multiple access (FDMA), single-carrier (SC) FDMA, OFDMA and other known modulation techniques. These modulation techniques demodulate signals received from multiple users of the wireless communication system to increase the capacity of the wireless communication system. Multi-access methods for downlink transmission and uplink transmission can be different from each other. For instance, OFDM can be used for downlink transmission and SC-FDMA can be used for uplink transmission.

The wireless communication system can be a multi-antenna system. The multi-antenna system can be a multiple-input multiple-output (MIMO) system. Otherwise, the multi-antenna system can be a multiple-input single-output (MISO) system, a single-input single-output (SISO) system or a single-input multiple-output (SIMO) system. The MIMO system uses multiple transmission antennas and multiple receiving antennas and the MISO system uses multiple transmission antennas and a single receiving antenna. The SISO system uses a single transmission antenna and a single receiving antenna and the SIMO system uses a single transmission antenna and multiple receiving antennas.

Figure 2:
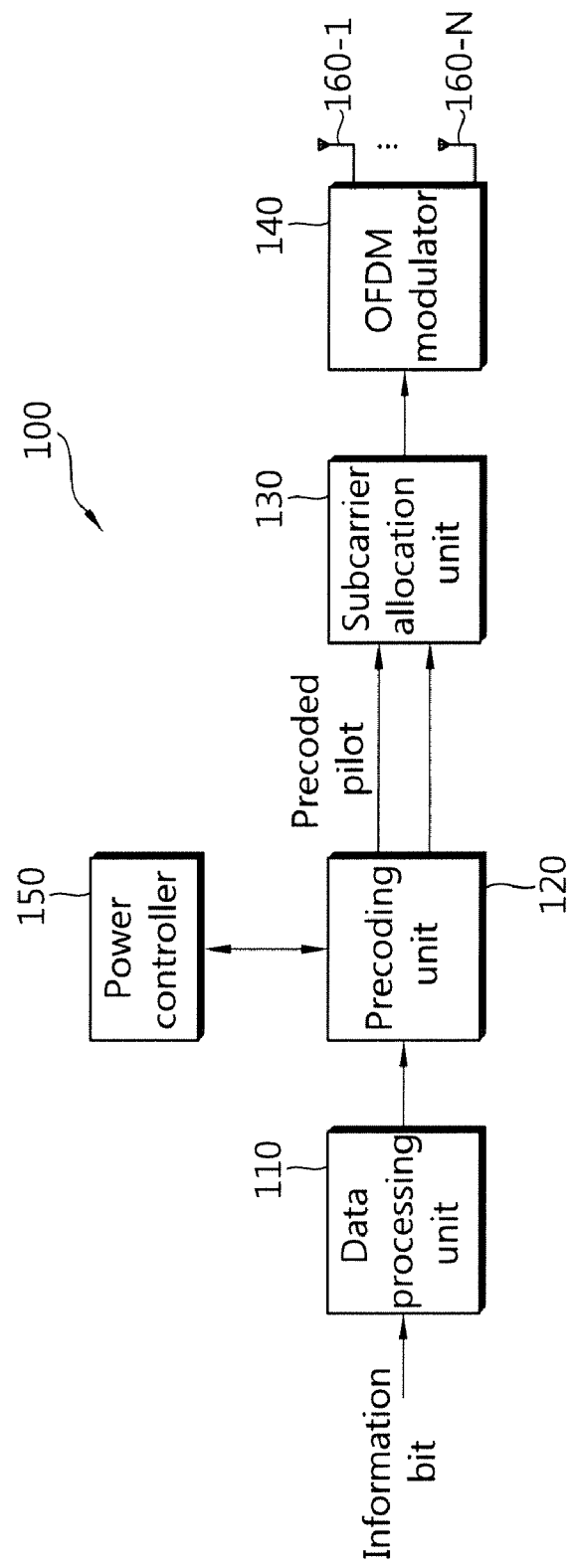
FIG. 2 is a block diagram of a pilot transmitter according to an embodiment of the present invention.

FIG. 2 is a block diagram of a pilot transmitter 100 according to an embodiment of the present invention. Referring to FIG. 2, the pilot transmitter 100 includes a data processing unit 110, a preceding unit 120, a subcarrier allocation unit 130, an OFDM modulator 140, and a power controller 150. The pilot transmitter 100 includes Nt (Nt>1) transmission antennas 160-1 through 160-Nt.

The data processing unit 110 performs channel coding on input information bits to generate a codeword and carries out constellation mapping on the codeword to generate a modulation symbol. The information bits may correspond to user data or control information.

The preceding unit 120 performs preceding on the modulation symbol and outputs a precoded signal. Here, preceding can be performed in such a manner that the modulation symbol is multiplexed by a preceding matrix. The preceding matrix includes at least one preceding vector. The preceding vector can be also referred to as a weight vector.

The preceding unit 120 can perform preceding on a pilot as well as the modulation symbol. The pilot is a signal known to the pilot transmitter 100 and a receiver for channel estimation and is referred to as a reference signal. A signal obtained by preceding the pilot is referred to as a precoded pilot or a dedicated pilot. The dedicated pilot is a pilot in which additional weight information is embedded and is distinguished from a common pilot that does not include the additional weight information. That is, the common pilot corresponds to a pilot transmitted for channel estimation and the dedicated pilot corresponds to a pilot transmitted to estimate a channel and a value including the additional weight information.

The subcarrier allocation unit 130 allocates subcarriers to precoded signals, that is, dedicated pilots.

The OFDM modulator 140 OFDM-modulates an input symbol and outputs an OFDM symbol. The OFDM modulator 140 can perform IFFT on the input symbol and embed a cyclic prefix CP in the inverse-fast-Fourier-transformed symbol. The OFDM symbol is transmitted through the transmission antennas 160-1 through 160-Nt.

The power controller 150 can control transmission powers of the precoded pilots specifically for data streams with respect to the respective precoded pilots or the receiver. For instance, the power controller 150 controls the transmission powers of the precoded pilots differently according to the data streams with respect to the respective precoded pilots. Precoding vectors for the data streams are transmitted through the precoded pilots and the transmission powers of the precoded pilots for the respective data streams can be controlled specifically for the receiver (UE) because the precoded pilots are UE specific pilots.

For instance, if a preceding matrix P includes four preceding vectors W, B={$W_0, W_1, W_2, W_3$}. Here, 0, 1, 2 and 3 are indexes of the preceding vectors. $W_k$ is a preceding vector applied to a kth data stream. If a channel through which a $0^{th}$ data stream is transmitted is very poor and a channel through which a second data stream is transmitted is satisfactory, the power controller 150 can determine the transmission power of a $0^{th}$ precoded pilot to which $W_0$ is applied as 3 dB and determine the transmission power of a second precoded pilot to which $W_2$ is applied as 0 dB. That is, the transmission power of a precoded pilot that will be subjected to a poor channel can be determined to be relatively high and the transmission power of a precoded pilot that will be subjected to a good channel can be determined to be relatively low.

A method of determining the transmission power of a precoded pilot is represented according to Equation 2.

$$y = HWS + N \quad \text{[Equation 2]}$$

Here, H represents a channel matrix, W represents a weight, S denotes a signal vector, and N denotes a noise vector. H has a size of $N_R \times N_T$. Here, $N_T$ represents the number of transmission antennas and $N_R$ represents the number of receiving antennas. The weight W can have a matrix or vector form. A common pilot is used to estimate the channel matrix H and a dedicated pilot is used to estimate HW. That is, the receiver uses HW obtained according to the dedicated pilot to detect S.

When HW is $H_{eq}$, $H_{eq}$ and W can be represented according to Equation 3.

$$H_{eq} = [H_{eq_1} H_{eq_2} \ldots H_{eq_n}] \quad \text{[Equation 3]}$$

$$W = [W_1 W_2 \ldots W_n]$$

Here, n is the number of data streams, $H_{eq}$ has a size of $N_R \times n$, and $W_n$ has a size of $N_T \times 1$. $H_{eq_n} = HW_n$ according to Equations 2 and 3.

If $\alpha_n$ represents a transmission power for an nth data stream, Equation 4 is accomplished.

$$\alpha_n H_{eq_n} = H\alpha_n W_n \quad \text{[Equation 4]}$$

That is, the transmission power of a precoded pilot according to a preceding vector at a desired point can be determined by controlling the weight $\alpha_n$. Transmission power levels may have continuous values or quantized values. In the latter case, the transmission power of each precoded pilot may have one of 0 dB, 3 dB, 6 dB, . . . .

The power control method of the power controller 150 is not limited and the power controller 150 can employ an open-loop method that controls power without having feedback information from the receiver or a closed-loop method that controls power by using the feedback information from the receiver. In the case of open-loop method, the pilot transmitter 100 directly determines the transmission power of a precoded pilot. In the case of closed-loop method, the pilot transmitter 100 can receive channel quality information (CQI) from the receiver and control $\alpha_n$ in consideration of the CQI.

Precoded pilots are respectively subjected to different channels, and thus channel estimation performances according to the respective precoded pilots may be different if the precoded pilots are transmitted with the same transmission power. Accordingly, the present invention controls transmission powers of the respective precoded pilots adaptively, individually and independently for the channels through which the precoded pilots are respectively transmitted to improve the overall channel estimation performance.

When the pilot transmitter 100 transmits data by using a spatial multiplexing technique, the pilot transmitter 100 composes a plurality of data streams through two methods. The first one is a single codeword (SCW) method that codes a single data block through a single channel encoder, segments the coded data block into a plurality of data streams and transmits the plurality of data streams through multiple antennas. The second one is a multiple codeword (MCW) method that segments a single data block into a plurality of data streams, respectively codes the plurality of data streams through channel encoders and transmits the respective coded data streams through multiple antennas. The single data block is coded and then divided into the multiple data streams in the SCW method while the single data block is divided into the multiple data streams and then coded in the MCW method.

Channels to which N data streams are subjected can be estimated through representative CQI (or average CQI) of the N data streams in a single user (SU) MIMO system using SCW, for example. However, some (referred to as robust data streams hereinafter) of the N data streams may be subjected to good channels and some (referred to as weak data streams hereinafter) of them may be subjected to poor channels. If the representative CQI is provided as a precoded pilot, channel estimation error of an equivalent channel of a weak data stream may increase. In this case, channel estimation performance can be improved by boosting the transmission power of a precoded pilot of the weak data stream.

This can be applied to an SU MIMO system or a multi-user (MU) MIMO system that uses MCW. The MCW MU-MIMO system pairs receivers located in different spaces and allocates the same frequency/time resources to paired receivers to improve spectral efficiency. The MCW SU-MIMO system selects a modulation and coding scheme (MCS) suitable for CQI of each data stream. Here, the MCW SU-MIMO system can select a low MCS for data streams corresponding to low CQI to secure robust transmission. Furthermore, equivalent channel estimation performance for data demodulation can be improved if transmission powers of precoded pilots for the data streams corresponding to the low CQI.

The MCW MU-MIMO system can also use a precoded pilot for each receiver and the power of the precoded pilot can be controlled specifically for each receiver.

Figure 3:
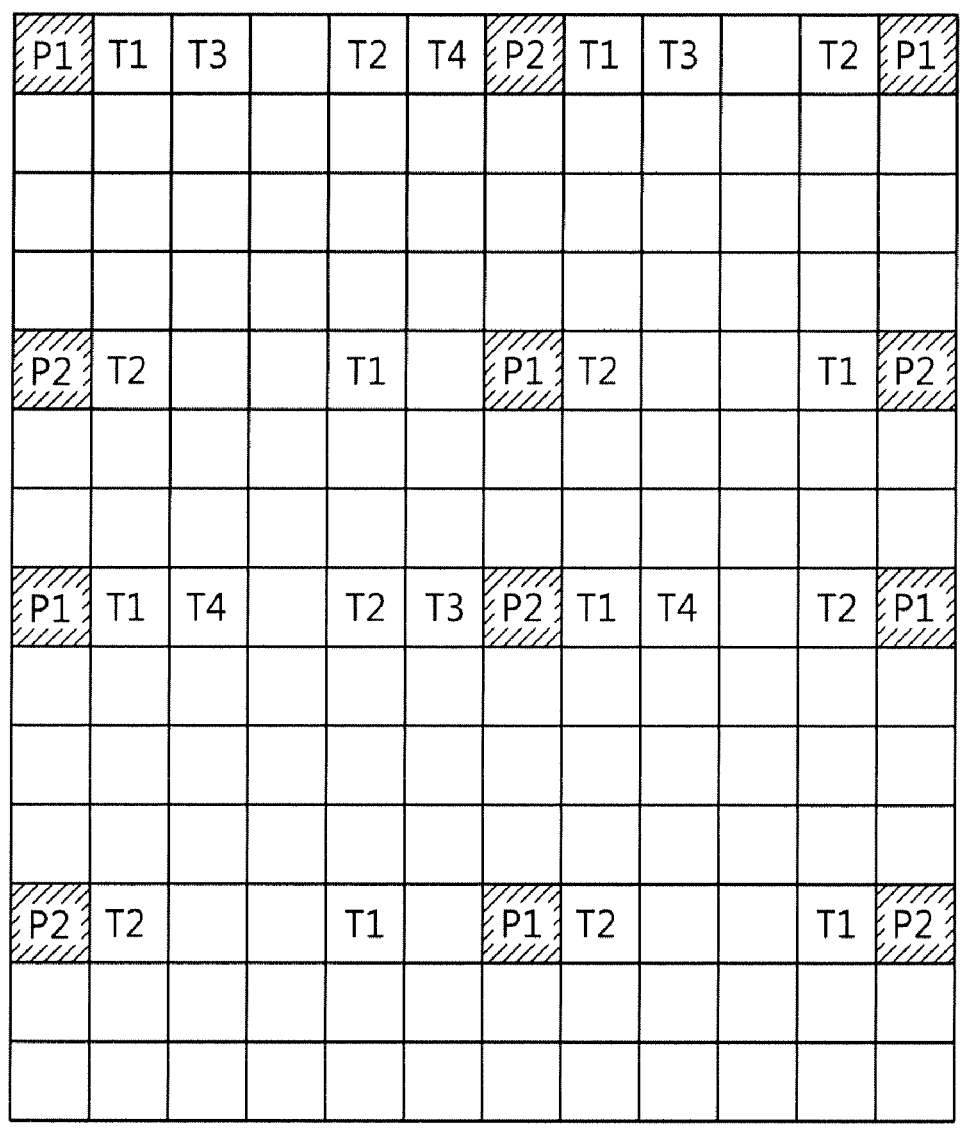
FIG. 3 illustrates an example of a subframe.

FIG. 3 illustrates an example of a subframe. A subframe includes a plurality of OFDM symbols in a time domain and a plurality of subcarriers in a frequency domain. The subframe is a resource grid defined for each transmission antenna. A transmission time interval (TTI) is a time during which a single subframe is transmitted. A radio frame may include a plurality of subframes. For instance, a single radio frame can include ten subframes.

Referring to FIG. 3, first, second, third and fourth common pilots T1, T2, T3 and T4 and first and precoded pilots P1 and P2 are distributed and arranged on the subframe. The first common pilot T1 is transmitted through a first transmission antenna, the second common pilot T2 is transmitted through a second transmission antenna, the third common pilot T3 is transmitted through a third transmission antenna, and the fourth common pilot T4 is transmitted through a fourth transmission antenna. The first precoded pilot P1 is a dedicated pilot transmitted through the first transmission antenna and the second precoded pilot P2 is a dedicated pilot transmitted through the second transmission antenna.

While FIG. 3 shows the common pilots transmitted through the four transmission antennas and the dedicated pilots transmitted through the two transmission antennas, the number of transmission antennas transmitting common pilots or dedicated pilots is not limited thereto. Furthermore, the arrangement of the common pilots and the dedicated pilots is exemplary and the common pilots and the dedicated pilots can be arranged in various forms on the subframe.

Figure 4:
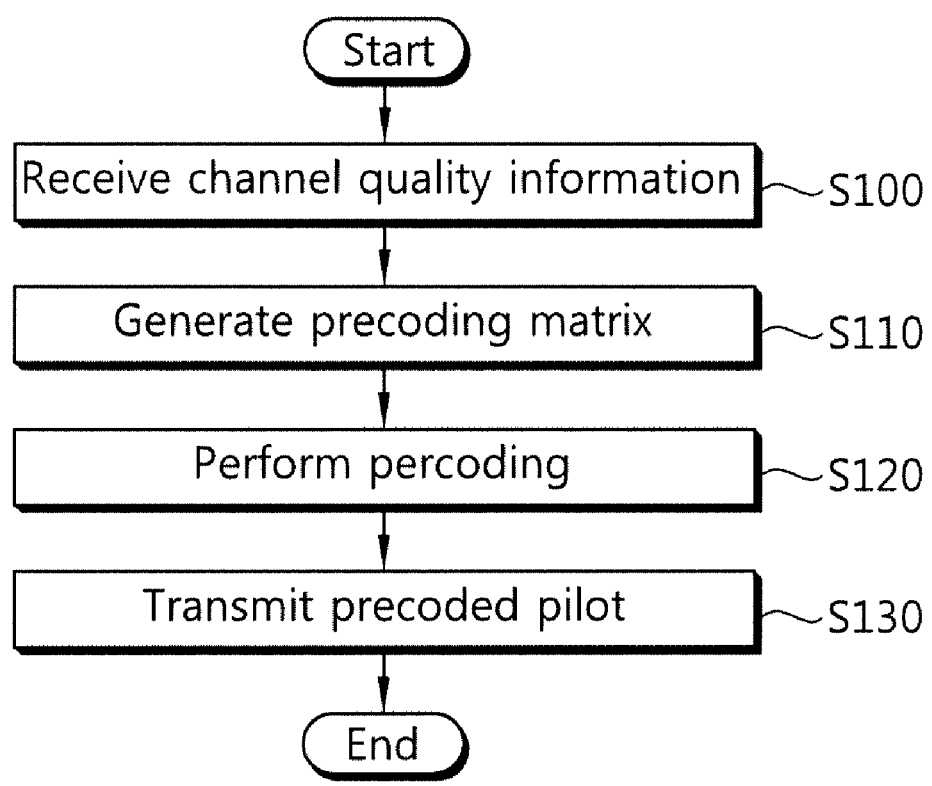
FIG. 4 is a flow chart illustrating a pilot transmitting method in a multi-antenna system according to an embodiment of the present invention.

FIG. 4 is a flow chart illustrating a pilot transmitting method in a multi-antenna system according to an embodiment of the present invention.

Referring to FIG. 4, CQI is received in step S100. The CQI includes a standard that reflects the state of a channel to which a signal transmitted from a transmitter is subjected. For instance, the CQI can be an SNR.

Subsequently, a preceding matrix is generated in step S110. The preceding matrix includes at least one preceding vector to be applied to a data stream to be transmitted. The preceding vector is also referred to as a weight vector and can be obtained according to a codebook based closed-loop technique that reflects the state of a channel to which a received signal is subjected or according to an open-loop technique that determines the preceding vector through a transmitter irrespective of a channel state.

A pilot with respect to the data stream to be transmitted is precoded using the preceding matrix in step S120. Precoding is performed in such a manner that input data and/or pilot is multiplied by the preceding matrix. Here, the transmission power of the precoded pilot with respect to the data stream to be transmitted is determined specifically for the data stream. The CQI can be used to determine a transmission power level of the pilot. That is, a relatively low transmission power can be provided to a pilot that will be subjected to a good channel and a relatively high transmission power can be provided to a pilot that will be subjected to a poor channel. Accordingly, pilots can be transmitted according to adaptively determined transmission powers and channel estimation performance can be improved.

Meantime, there may be a case where it is required to maintain the overall transmission power of OFDM symbols uniform even if transmission powers are respectively controlled for pilots. In this case, some of the transmission power used to transmit data can be used as the transmission power of a pilot. Otherwise, some of subcarriers used to transmit data can be punctured.

The precoded pilot is transmitted in step S130. The transmission power of the precoded pilot can be transmitted as additional control information. Here, the transmission power of the precoded pilot with respect to each data stream can be provided as independent information or integrated information such as a transmission power ratio.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting a pilot in a multi-antenna system, the method comprising:
   generating, by a base station, a precoding matrix including precoding vectors, each of the precoding vectors to be applied to a corresponding one of data streams to be transmitted;
   determining, by the base station, weights, each of the weights to be applied to a corresponding one of the precoding vectors;
   multiplying, by the base station, each of the weights and the corresponding one of the precoding vectors;
   performing, by the base station, precoding for the pilot by using products of the multiplying; and
   transmitting, by the base station, the precoded pilot,
   wherein the precoding vectors are selected from a predetermined codebook, and
   wherein a transmission power of the precoded pilot is determined based on the weights.

2. The method of claim 1, further comprising:
   receiving, by the base station, channel information regarding a channel through which the data streams are to be transmitted,
   wherein determining the weights comprises determining the weights using the channel information.

3. The method of claim 2, wherein the channel information corresponds to a signal-to-interference noise ratio (SINR).

4. The method of claim 1, further comprising:
   receiving, by the base station, a transmission power indicator indicating the transmission power of the precoded pilot.

5. An apparatus for transmitting pilots in a multi-antenna system, the apparatus comprising:
   a precoding unit for generating a precoding matrix including precoding vectors, each of the precoding vectors to be applied to a corresponding one of a plurality of data streams to be transmitted;
   a power controller for determining weights, each of the weights to be applied to a corresponding one of the precoding vectors,
   wherein the precoding unit is further for multiplying each of the weights and the corresponding one of the precoding vectors and for performing precoding for the pilots by using the products of the multiplying,
   wherein the precoding vectors are selected from a predetermined codebook,
   wherein a transmission power of each of the precoded pilots is determined based on the weights, and
   wherein the transmitter further comprises:
   a subcarrier allocation unit for mapping the precoded pilots to subcarriers;
   an orthogonal frequency division multiplexing (OFDM) modulator for performing inverse fast fourier transformation (IFFT) on the precoded pilots mapped to the subcarriers in order to generate OFDM symbols; and
   a plurality of antennas for transmitting the OFDM symbols.

6. The apparatus of claim 5, wherein the power controller is further for determining the weights based on quantized values.

7. The apparatus of claim 5, wherein the power controller is further for determining the weights by using channel quality information fed back from a receiver.

8. The apparatus of claim 5, wherein the power controller is further for determining the weights specifically for a receiver.

* * * * *